Jan. 26, 1960

A. J. PERKINS 2,922,583

PIPE LINING MACHINE

Filed April 6, 1959

INVENTOR.
Alfred J. Perkins,
BY
Beau, Brooks, Buckley & Beau.
ATTORNEYS.

Jan. 26, 1960 A. J. PERKINS 2,922,583
PIPE LINING MACHINE
Filed April 6, 1959 2 Sheets-Sheet 2
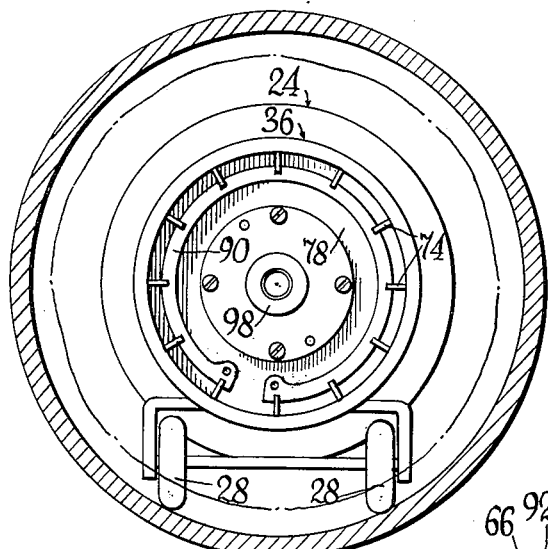
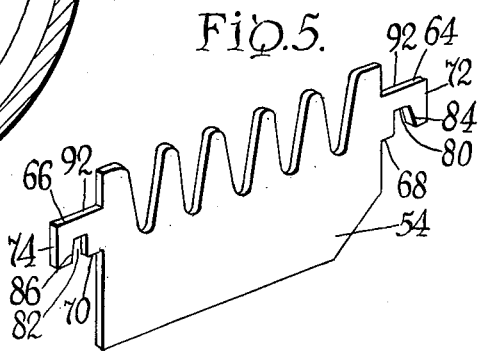
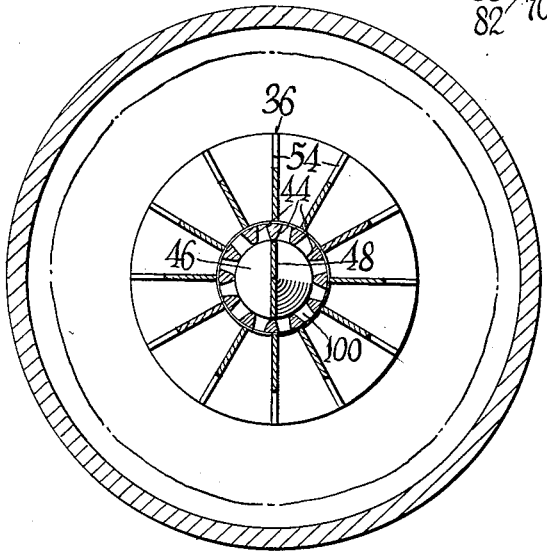
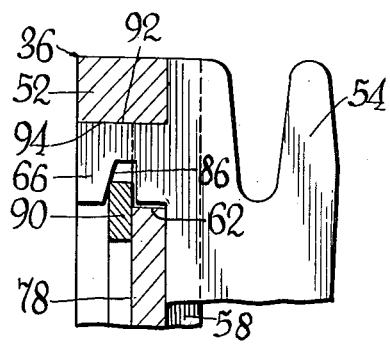
INVENTOR.
Alfred J. Perkins,
BY
Bean, Brooks, Buckley + Bean
ATTORNEYS.

United States Patent Office

2,922,583
Patented Jan. 26, 1960

2,922,583

PIPE LINING MACHINE

Alfred J. Perkins, Medulla, Fla., assignor to Perkins Pipe Linings, Inc., Grand Island, N.Y.

Application April 6, 1959, Serial No. 804,332

8 Claims. (Cl. 239—215)

This invention relates to pipe lining apparatus and more particularly to a pipe lining applicator machine having an improved lining material distributor head structure.

Pipe lining applicator machines of the general kind which apply cement mortar or like lining material to the interior wall of the pipe by centrifugal force have been known and used for many years. Very commonly, the lining material distributor head employed on machines of this kind comprises a structure of generally cylindrical outline having a central stator comprising a material feed conduit having an outlet portion, usually formed with a plurality of ports through which the lining material is extruded, and, a rotor comprising a part embracing the ported outlet portion of the feed conduit and including forward and rear transverse plate structures bridged by radial vanes which pick up the mortar extruded through the stator ports and fling it by centrifugal force to the pipe wall.

In distributor head structures of the aforedescribed general kind, it is important that close tolerances be maintained between the stator and rotor, particularly between the stator outlet ports and the roots or inner edges of the rotor vanes. Accordingly, it is important that the rotor be dimensionally accurate and remain so during use. The most commonly employed lining material is cement mortar, which is, of course, highly abrasive, and therefore it is desirable that worn parts be easily replaceable for maintaining the desired close tolerances. For example, it has been found that the inner edges or roots of the distributor head vanes wear appreciably during as little as one day's use, and therefore are desirably replaced at the end of each operating day.

As the machine parts are miniaturized for employment in lining of small diameter pipes, for example pipes of sixteen inch, eight inch or even less diameter, provision for easy replacement of the worn vane parts becomes a problem, especially when it is considered that the rotor structure must be dimensionally precise. Furthermore, the requirement of rigidity of the rotor structure as a whole may be especially demanding in the construction of machines for lining small diameter pipes, since in machines of small size it is frequently desirable that the entire rotor structure be cantilevered from its leading end part.

In accordance with the present invention there is provided a distributor head structure, of the general class aforedescribed, wherein the vanes may be removed and replaced with utmost facility and yet wherein the securement of the replaceable vane parts to the end plates is so rigid and close in tolerance that the trailing or rear end portions of the rotor as well as rotor parts projecting within the stator may be, and preferably are, supported by connection to the forward plate of the rotor entirely through the replaceable vanes.

Accordingly, a major object of the invention is to provide a pipe lining machine of the centrifugal applicator type having an improved pipe lining material distributor head.

Another object of the invention is to provide, in a pipe lining machine as aforesaid, an improved practical distributor head of simplified structure which nevertheless provides a high degree of dimensional accuracy enabling close operating tolerances between the rotor and stator parts thereof.

Another object of the invention is to provide a pipe-lining machine distributor head structure as aforesaid characterized by easy replaceability of worn parts for enabling maintenance of the desired close operating tolerances in use.

Still another object of the invention is to provide a distributor head structure having the foregoing qualities, and yet being adapted to miniaturization readily for employment in machines designed to line small diameter pipe, while remaining rugged and reliable under field operating conditions.

Another object of the invention is to provide a distributor head structure as aforesaid wherein worn vanes may be replaced at a minimum cost, both in time and as to expense of replacement parts.

Other objects of the invention will be apparent from the foregoing, from the following detailed dscription, from the claims, and from the drawings wherein:

Fig. 3 is a sectional view taken about along line III—III of Fig. 2;

Fig. 4 is a sectional view taken about along line IV—IV of Fig. 2;

Fig. 5 is a perspective view of one of the distributor head vanes shown in Fig. 2; and Fig. 6 is an enlarged fragmentary and further broken away view corresponding to a portion of Fig. 2, showing in greater detail a portion of the connection of one of the distributor head vanes to one of the rotor end plates.

Figure 1:
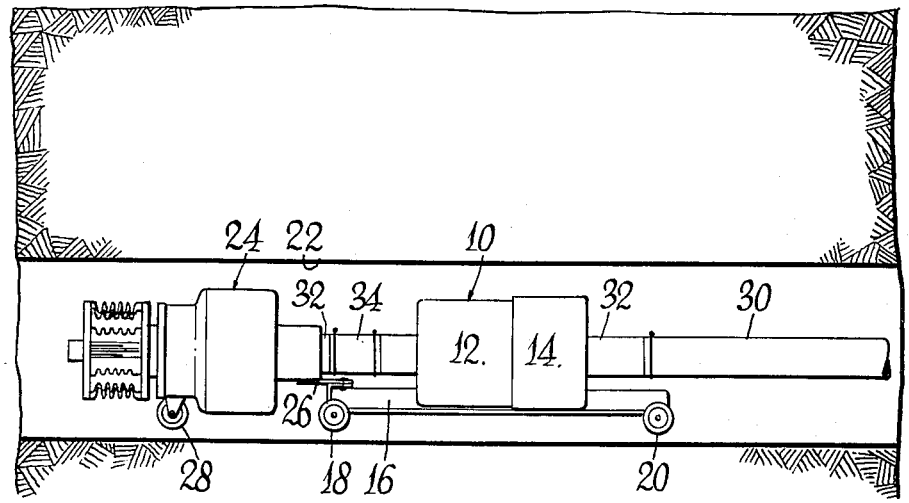
Fig. 1 is a semi-diagrammatic sectional view of a pipe line in place in the ground, showing a pipe lining machine embodying the invention therein for applying a lining thereto.

Referring more particularly to the drawings, the centrifugal applicator type pipe lining machine illustrated in Fig. 1 is shown, for example, to include a locomotive section 10 having a motor 12 and a speed reducer and transmission arrangement 14, 16 through which the motor 12 drives traction wheels 18, 20 by which the machine is propelled through the pipe 22 being lined. The illustrated machine includes also an applicator section 24 pivotally connected in semi-trailer fashion, as by a coupling tongue 26, to the locomotive for being propelled thereby as well as, in combination with its own trailer wheels 28 to be supported within the pipe 22 generally co-axially therewith for applying a lining thereto. Also as indicated in Fig. 1, the illustrated machine is of the kind employing lining material supplied from a remote location such as a pump (not shown) above ground and delivered through a flexible supply hose 30 to the feed conduit 32 of the machine which itself has a flexible section 34 corresponding to the pivotal connection between the machine sections. The pipe lining machine as thus far described is of the general form shown in U.S. Patent No. 2,758,352, and is typical of the general class of pipe lining machines which may embody the improved distributor head structure of the present invention to advantage.

Figure 2:
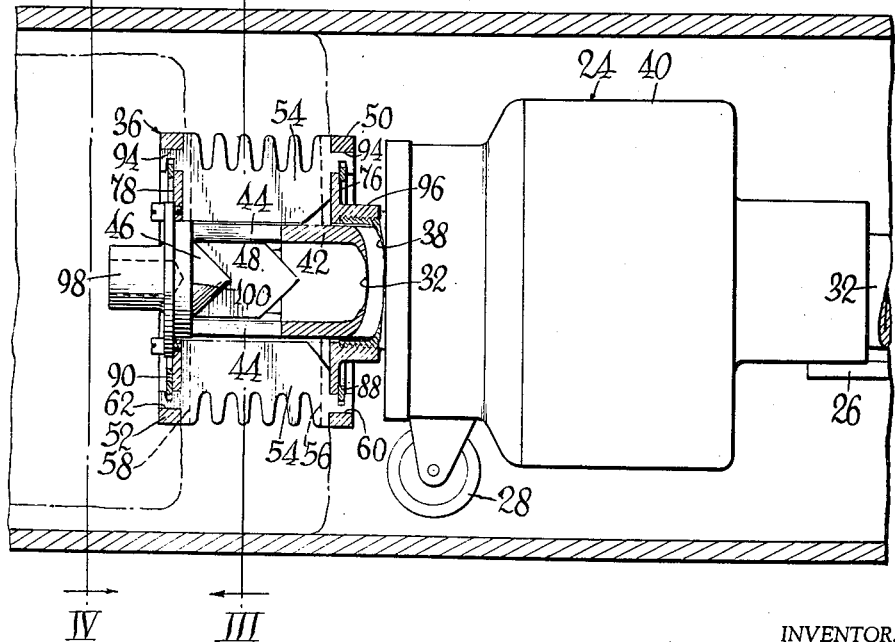
Fig. 2 is an enlarged fragmentary sectional and partly broken away view of the pipelining machine of Fig. 1 and of the pipe being lined thereby, showing a preferred embodiment of the distributor head structure of the invention.

Referring now to Fig. 2, the illustrated pipe lining machine is shown to incorporate a preferred embodiment of the distributor head 36 of the present invention. Cooperative with the improved head structure, the presently illustrated pipe lining machine has a hollow distributor head drive shaft 38 coaxially embracing the lining material feed conduit 32, the shaft 38 being the output shaft of a hollow type electric motor 40 which passes the feed conduit 32 in accordance with the general organization shown in the aforesaid U.S. Patent No. 2,758,352. In the presently illustrated distributor head structure, the distributor head comprises a stator portion 42 which is continuous with and formed by an extension of the feed conduit 32 and is provided with a plurality of radially opening discharge ports 44 through which the lining material is extruded, by the remotely induced pressure of the lining material within the feed conduit 32 as aided by the action of a conical deflecting baffle 46 and agitator plate 48 carried thereby, the baffle 46 and the agitator plate 48 being part of the distributor head rotor structure as will be described more fully.

In accordance with the present invention the distributor head rotor 36 is, as aforesaid, an improved and simplified construction providing dimensional accuracy and rigidity while providing for ready replacement of parts occupying critical tolerance positions, namely the distributor vanes, as such parts wear due to the abrasive action of the lining material distributed thereby. In the embodiment illustrated, the distributor head rotor comprises forward or leading and rear or trailing end plate members 50, 52 maintained in assembled relative relation by a plurality of distributor head vanes 54 which are oriented radially of the distributor head and are connected fixedly with the respective end plates 50, 52 by releasably but very secure and positionally accurate attachment means about to be described.

As shown in Figs. 2 and 6, the end plates 50, 52 are formed on their opposing surfaces or faces with corresponding sets of radial grooves 56, 58 which receive the opposite end edge portions of the vane plates 54 in closely nesting relation, thereby accurately fixing the angular disposition of the several vane plates. Additionally, each of the end plates 50, 52 is formed with a slot or aperture 62 extending therethrough from the root or base face of each of the several vane receiving grooves 56, 58. Referring now to Figs. 2, 5 and 6 each of the several vane plates 54 is formed with a pair of laterally extending ears 64, 66 having root portions 68, 70 fitting the apertures 62 of the end plates with a close tolerance and having outwardly extending retainer hook portions 72, 74 dimensioned to extend through the apertures 62 and beyond face portions 76, 78 on the longitudinally or axially outer sides of the corresponding plates 50, 52 as shown. Each of the retainer portions is given its hook shape by a notch or slot 80, 82 therein, preferably opening in the radially inwardly direction with respect to the assembled position of the vane 54, and preferably also having its outer side face 84, 86 laterally outwardly flared.

Each of the hook portions 72, 74 comprises a laterally locating lock part on the corresponding vane 54 comprising locating means attaching the corresponding vane 54 to the corresponding end plate 50, 52 for fixing the relative positions of the three parts longitudinally in the distributor head rotor. This attachment means is completed by a resilient retainer or snap ring 88, 90 which constitutes detent means engaging the corresponding outwardly flared faces 84, 86 of the hook parts 72, 74 and the adjacent faces 76, 78 of the outer sides of the end plates 50, 52, whereby to clamp the corresponding side edges of the vane plates 54 tightly against the root or base faces of the grooves 56, 58 by the reaction force of the resilient snap rings 88, 90 as communicated from the end plate outer faces 76, 78, through the rings and the outwardly flaring faces 84, 86 of the catch portions of the retainer ears 64, 66.

From the foregoing it will be seen that the end plate grooves 56, 58 receive or guide and therefore accurately locate the angular disposition of the several vane plates 54, the retainer ears locate the radial position of the vane plates, and the retainer hook 72, 74 and snap ring 88, 90 combinations maintain the side edges of the several vane plates 54 firmly seated against the root or base faces of the grooves 56, 58 and therefore snugly and accurately locate the positions of the distributor end plates 50, 52 and vanes 54 relative to each other longitudinally or axially of the distributor rotor. Importantly, as shown in Fig. 6, such tolerance as is necessary or convenient for passing the ears 64, 66 into and through the apertures 62 in the end plates is taken up by the resilient force of the snap or retainer rings 88, 90 pressing radially limiting edges, preferably the radially outer edges 92 of the vane ears 64, 66, in tightly seating relation against the opposing faces 94 of the ear receiving apertures. Thus the clearance between the radially inner or root edges of the vanes 54 and the stator is accurately determined.

It will be noted that the preferred snap rings 88, 90 are expansion rings, that is they are deformed compressively from their normal set when in installed position, and that as they move to their seated position, their motion and the force exerted by them on the vane ears 64, 66 are centrifugal relative to the rotational axis to the distributor head rotor. Accordingly the centrifugal force to which the parts are subjected when the rotor is in operation serves to seat the snap rings 88, 90 all the more firmly and to press the distributor head vane mounting ears all the more snugly against the critical mounting surfaces 94 of the rotor end plate slots receiving the same. Accordingly, although the rotor ordinarily turns at considerable speed for flinging the lining material to the pipe wall and the lining material itself exerts considerable outward frictional force on the vanes 54, and although flying sand, debris, and the like encountered in the operation in pipelining machines of this kind may strike the retainer snap rings 88, 90, none of the various centrifugal forces disturbs the positions of the parts, but, rather, such forces serve only to seat and locate the vanes 54 and the snap rings 88, 90 all the more firmly.

The distributor head rotor structure is completed by an interiorly threaded hub 96 on the forward end plate 50 which engages upon companion threads on the end of the hollow shaft 38 of the rotor drive motor 40, and by a cap portion 98 attached as shown to the trailing end plate 52 to form a part thereof constituting a closure for the end of the stator 42, the portion 98 being formed with the aforedescribed conical baffle 46 which together with the aforementioned agitator plate 48 carried thereby extends into the stator part 42.

It will be seen that the distributor head rotor structure of the invention constitutes very simple arrangement of parts interconnected rigidly and accurately whereby close tolerances may be preserved between the root edges of the vanes 54 and the proximate portions of the distributor head stator 42 as well as between the end and interior faces of the stator 42 and the inner face 100 of the rotor-borne end closure 98 and the inwardly projecting parts 46, 48 carried thereby, all despite the facts that the entire distributor head rotor structure is supported in outboard fashion from its hub 96 and that the vane plates 54 are arranged for ready removal and replacement. When it is desired to replace the vane plates, which as explained above may be as often as once a day, it is necessary only to remove the snap rings 88, 90, withdraw trailing end plate 52 from its position on the vanes 54, remove the vanes, and then reverse that sequence of events, utilizing new vanes. It will be seen that the only parts ordinarily replaced, the vanes 54, are of simple planar shape and therefore may be furnished at minimum cost for being discarded after wear.

While only one embodiment of the invention has been illustrated and described in detail, it will be understood that the invention may be otherwise embodied within the spirit of the invention and the scope of the appended claims.

What is claimed is:

1. In a pipe lining applicator machine, a pipe lining material distributor head rotor comprising a pair of transverse end plates and a plurality of radial vane plates bridging therebetween, said end plates having guide means receiving corresponding side edges of said vane plates, said side edges being formed with laterally extending locking ears and said end plates being formed with through apertures receiving said ears, said ears being formed with centripetally facing lock notches having flaringly tapered laterally outer sides, and expansion snap ring means engaged in said notches against the flaring outer sides thereof and in embracing engagement with the pair of end plates.

2. In a pipe lining applicator machine, a pipe lining material distributor head rotor structure comprising a rotatable hollow shaft, a first annular end plate fixed on said shaft transversely to the axis thereof, a second end plate companion to said first plate, a plurality of vane plates, and locator means attaching said vane plates to said end plates to extend therebetween radially with respect to the axes thereof, said locator means comprising laterally extending ears on the side edges of said vane plates each formed with a laterally locating lock slot, said end plates being formed with apertures receiving said ears, and detent means on said end plates and operatively engaged in each of said slots.

3. In a pipe lining applicator machine, a pipe lining material distributor head rotor structure comprising a rotatable hollow shaft, a first annular end plate fixed on said shaft transversely to the axis thereof, a second end plate companion to said first plate, a plurality of vane plates, and locator means attaching said vane plates to said end plates to extend therebetween radially with respect to the axes thereof, said locator means comprising laterally extending ears on the side edges of said vane plates each formed with a laterally locating lock slot, said end plates being formed with apertures receiving said ears, and resiliently releasable detent means on said end plates and operatively engaged in each of said slots, said detent means being disposed to engage operatively in said slots upon movement thereinto radially outwardly with respect to the axis of said rotor.

4. In a pipe lining applicator machine, a pipe lining material distributor head rotor comprising a pair of transverse end plates and a plurality of radial vane plates bridging therebetween, the side edges of said vane plates being formed with laterally extending locking ears and said end plates being formed with through apertures receiving said ears, said ears being formed with laterally locating lock slots and snap ring means engaged in said slots and in embracing engagement with the pair of end plates.

5. In a pipe lining applicator machine, a pipe lining material distributor head rotor comprising a pair of transverse end plates and a plurality of radial vane plates bridging therebetween, said end plates being formed with grooves receiving corresponding side edges of said vane plates, said side edges being formed with laterally extending locking ears and said end plates being formed with through apertures receiving said ears, said ears being formed with laterally locating lock notches having flaringly tapered laterally outer sides, and snap ring means engaged in said notches against the flaring outer sides thereof and in embracing engagement with the pair of end plates for seating said side edges of said vanes in said grooves.

6. In a pipe lining applicator machine, a pipe lining material distributor head rotor structure comprising a rotatable hollow shaft, a first annular end plate fixed on said shaft transversely to the axis thereof, a second end plate companion to said first plate, said first and second end plates being formed with companion sets of radial grooves in their opposing faces and an aperture through the corresponding plate in each of said grooves, a plurality of vane plates each taking at its opposite side edges in one and the other of a companion pair of said grooves and each having at each of said edges a laterally extending ear projecting through said aperture in the corresponding groove, each of said ears being formed with a centripetally opening notch having a flaringly tapered outer side, and expansion snap ring means engaged in each of said notches against said outer side and in embracing engagement with the pair of end plates.

7. In a pipe lining applicator machine, a pipe lining material distributor head rotor structure comprising a rotatable hollow shaft, a first annular end plate fixed on said shaft transversely to the axis thereof, a second end plate companion to said first plate, said first and second end plates being formed with companion sets of radial grooves in their opposing faces and an aperture through the corresponding plate in each of said grooves, a plurality of vane plates each taking at its opposite side edges in one and the other of a companion pair of said grooves and each having at each of said edges a laterally extending ear projecting through said aperture in the corresponding groove, each of said ears being formed with a shank portion and a hook portion extending therebeyond, said hook portion being shaped with a centripetally opening notch having a flaringly tapered outer side, and expansion snap ring means engaged in each of said notches against said outer side and in embracing engagement with the pair of end plates, said end plate apertures being formed to cooperate with said ear shank portions to limit the radially outward displacement of said vane plates.

8. In a pipe lining applicator machine, a pipe lining material distributor head structure comprising a rotatable hollow power shaft, a stator part comprising an open ended conduit extending from within said shaft and terminating in a radially ported portion, a pair of transverse end plate members and a plurality of radial vane plates bridging therebetween in closely embracing relation to said ported portion, one of said plate members being annular and being fixed to said shaft and the other of said plate members having a part forming an end closure for said conduit and extending within said ported portion thereof, said end plate members being formed with radial grooves receiving corresponding side edges of said vane plates, said side edges being formed with laterally extending locking ears and said end plates being formed with through apertures receiving and forming radial position stop means for said ears, said ears being formed with laterally locating lock notches having flaringly tapered laterally outer sides, and snap ring means engaged in said notches against the flaring outer sides thereof and in embracing engagement with the pair of end plates for seating said side edges in said grooves and said ears against said stop means.

References Cited in the file of this patent

UNITED STATES PATENTS

| | | |
|---|---|---|
| 2,262,647 | Perkins | Nov. 11, 1941 |
| 2,287,448 | Perkins | June 23, 1942 |
| 2,303,088 | Perkins | Nov. 24, 1942 |
| 2,607,991 | Perkins | Mar. 2, 1954 |
| 2,758,352 | Perkins | Aug. 14, 1956 |
| 2,839,026 | Matheny | June 17, 1958 |
| 2,865,322 | Perkins | Dec. 23, 1958 |